United States Patent [19]

Nakanose et al.

[11] Patent Number: 5,683,523
[45] Date of Patent: Nov. 4, 1997

[54] TITANIUM ALLOY FOR SUPER HIGH VACUUM VESSELS

[75] Inventors: Megumi Nakanose, Sagamihara; Seiji Ishimoto, Mitaka; Katsuichi Kikuchi; Kiyotaka Fujita, both of Tokyo, all of Japan

[73] Assignee: Nissan Motor Co., Ltd., Yokohama, Japan

[21] Appl. No.: 513,283

[22] Filed: Aug. 10, 1995

Related U.S. Application Data

[62] Division of Ser. No. 98,151, Jul. 28, 1993, Pat. No. 5,478,524.

[30] Foreign Application Priority Data

Aug. 24, 1992 [JP] Japan .................... 4-224225
Apr. 20, 1993 [JP] Japan .................... 5-92852

[51] Int. Cl.$^6$ .................... C22C 14/00; B65B 31/04
[52] U.S. Cl. .................... 148/317; 148/421; 420/417; 141/65
[58] Field of Search .................... 420/417; 148/421, 148/317; 141/65, 292

[56] References Cited

U.S. PATENT DOCUMENTS

| | | | |
|---|---|---|---|
| 4,253,933 | 3/1981 | Sato et al. | |
| 4,666,666 | 5/1987 | Taki et al. | |
| 4,859,415 | 8/1989 | Shida et al. | |
| 5,091,148 | 2/1992 | Prasad | |
| 5,156,807 | 10/1992 | Nagata et al. | |
| 5,316,722 | 5/1994 | Sugizaki et al. | 148/421 |
| 5,437,835 | 8/1995 | Sugizaki et al. | 148/421 |
| 5,514,332 | 5/1996 | Horiya et al. | 148/421 |

FOREIGN PATENT DOCUMENTS

| | | |
|---|---|---|
| 0-082 920 | 7/1983 | European Pat. Off. |
| 2900057 | 3/1980 | Germany . |
| 59-153514 | 9/1984 | Japan . |
| 59-183926 | 10/1984 | Japan . |
| 60-36648 | 2/1985 | Japan . |
| 60-128258 | 7/1985 | Japan . |
| 60-128259 | 7/1985 | Japan . |
| 63-103073 | 5/1988 | Japan . |
| 1-316439 | 12/1989 | Japan . |
| 3-31451 | 2/1991 | Japan . |
| 3-232530 | 10/1991 | Japan . |

OTHER PUBLICATIONS

CA 120: 329013, 1994 (of JP 06-65,661 A2).

*Primary Examiner*—David A. Simmons
*Assistant Examiner*—Margery S. Phipps
*Attorney, Agent, or Firm*—Lowe, Price, LeBlanc & Becker

[57] ABSTRACT

A light-weight super high vacuum vessel is disclosed in which a super high vacuum pressure over $10^{-10}$ Torr or over $10^{-11}$ Torr can be achieved using a simple evacuation system and/or with a sealing structure. The super high vacuum vessel contains a member comprising: from 0.02 wt. % to 1.00 wt. % of at least one platinum-group metal selected from the group consisting of Pd, Pt, Rh, Ru, Re, and Os; from 0.1 wt. % to 3.0 wt. % of at least one transition metal selected from the group consisting of Co, Fe, Cr, Ni, Mn, and Cu; from 0.1 wt. % to 3.0 wt. % of at least one rare earth series element selected from the group consisting of La, Ce, Pr, Nd, Sm, Gd, Tb, Dy, Ho, Er, and Y; impurity elements of C, N, and O, C being equal to or less than 0.05 wt. %, N being equal to or less than 0.05 wt. %, O being equal to or less than 0.08 wt. %; and Ti and inevitable impurities.

17 Claims, 10 Drawing Sheets

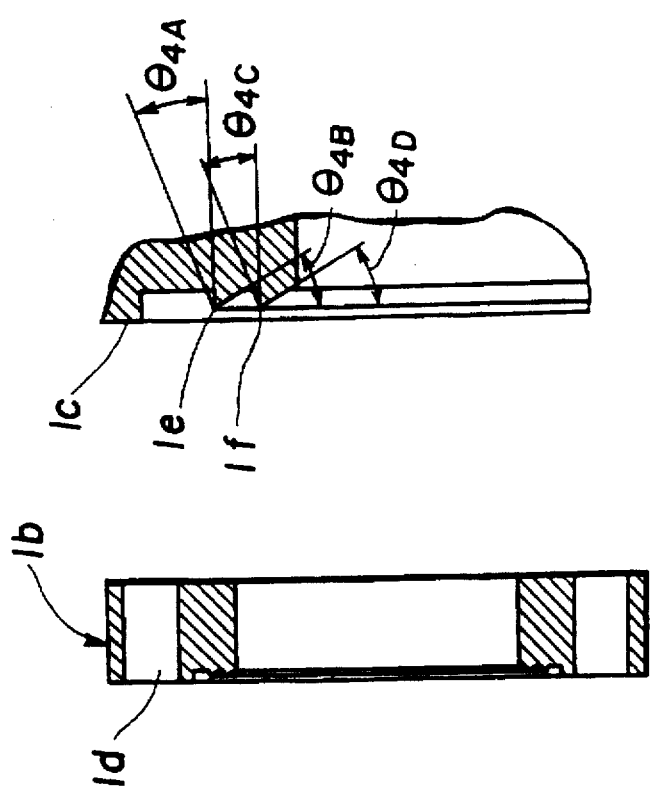
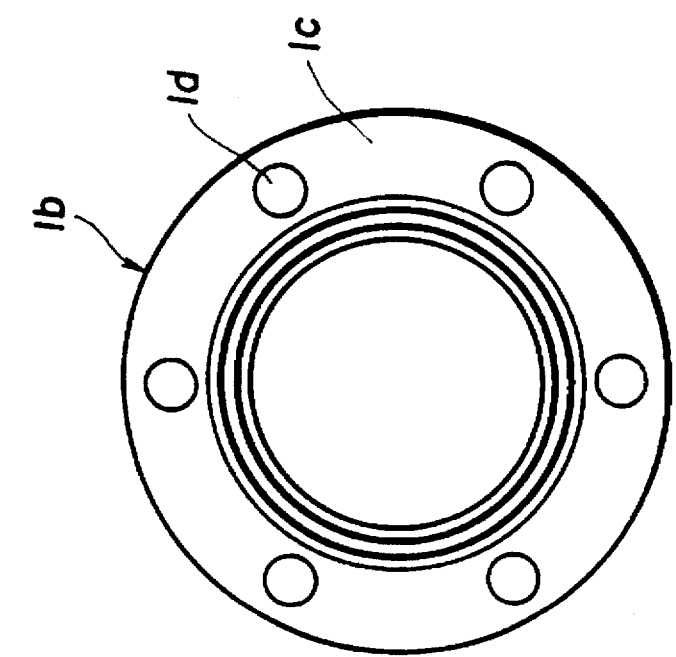

TITANIUM ALLOY FOR SUPER HIGH VACUUM VESSELS

This application is a division of application Ser. No. 08/098,151 filed Jul. 28, 1993, now U.S. Pat. No. 5,478,524.

BACKGROUND OF THE INVENTION

The present invention relates to a super high vacuum vessel suitable for achieving therein a super high vacuum pressure and its sealing structure, for example, a vacuum pressure exceeding $10^{-10}$ Torr or $10^{-11}$ Torr using a relatively simple evacuation system.

Japanese Patent Application First Publications Hesei 1-316439, Heisei 3-31451, Showa 60-36648, Showa 59-153514, Showa 59-183926, Showa 60-128258, Showa 63-12858, and Showa 63-103073 and Japanese Report (Vacuum Volume 341 (1991) page 56, exemplify a raw material composition of a super high vacuum vessel to achieve a high vacuum or super high vacuum pressure.

If a stainless steel is used for a member constituting the vacuum vessel, it is difficult to obtain the vacuum pressure exceeding $10^{-11}$ Torr by evacuation using a turbo pump which is relatively simple in construction. A very complex evacuation system, for example, a titanium supplemation pump or cryopump, is required to achieve the high vacuum pressure exceeding $10^{31\ 11}$ Torr.

Furthermore, the vacuum vessel made of a super purified steel or stainless steel is very heavy. If an Aluminum alloy is used, it is very difficult to achieve the super high vacuum pressure exceeding $10^{-11}$ Torr, since the gas discharge quantity from the vacuum vessel is large although the total weight thereof is light. If stainless steel is used as the raw material of the vacuum vessel, gas is discharged from the stainless steel so that an electrolytic polishing on an inner surface of the vacuum vessel or a super purified steel with extremely reduced impurities are required in order to obtain a super high vacuum pressure exceeding $10^{-11}$ Torr. In addition, a very complex evacuation system, such as an ion pump, titanium supplemation pump, or cryopump, is needed.

Recently, experimental use of a super high vacuum vessel in cosmic space was contemplated. In this case, the weight of the vacuum vessel material becomes critical. Stainless steel or super purified steel, is extremely heavy.

It is not easy to achieve the super high vacuum pressure exceeding $10^{-11}$ Torr, since an aluminum alloy provides a large gas discharge quantity, although it can be used as a light-weight vacuum vessel material.

SUMMARY OF THE INVENTION

It is, therefore, a principal object of the present invention to provide a light-weight super high vacuum vessel and its sealing structure which can achieve a super high vacuum pressure exceeding $10^{-10}$ Torr or $10^{-11}$ Torr, using our evacuation system having a relatively simple structure such as a turbo pump, without the use of an ion pump, titanium supplemation pump, or cryopump, and without gas leakage at a sealing structure of the super high vacuum vessel, and which can be handled under cosmic space.

The above-described object can be achieved by providing a super high vacuum vessel having a member suitable for a super high vacuum pressure, said member comprising: a) a 0.02 weight percent to 1.00 weight percent of a platinum group metal selected from one group consisting of Pd, Pt, Rh, Ru, Re, and Os; b) 0.1 weight percent to 3.0 weight percent of a transition metal selected from one group consisting of Co, Fe, Cr, Ni, Mn, and Cu; c) 0.02 weight percent to 0.50 weight percent of a rare earth element selected from one group consisting of La, Ce, Pr, Nd, Sm, Gd, Tb, Dy, Ho, Er and Y; d) an impurity element consisting of C, N, and O, C in an amount equal to or less than 0.05 wt. %, N being equal to or less than 0.05 wt. %, and O being equal to or less than 0.08 wt. %; and e) Ti and inevitable impurities.

The above-described object can also be achieved by providing a super high vacuum vessel having a member suitable for a super high vacuum pressure, said member comprising: a) 0.02 wt. % to 1.00 wt. % of at least one platinum group metal selected from the group consisting of Pd, Pt, Rh, Ru, Re, and Os; b) 0.1 wt. % to 3.0 wt. % of a transition metal selected from the group consisting of Co, Fe, Cr, Ni, Mn, and Cu; c) 0.1 wt. % to 3.0 wt. % of at least one rare earth metal selected from the group consisting of La, Ce, Pr, Nd, Sm, Gd, Tb, Dy, Ho, Er, and Y; d) 0.2 wt. % to 9.5 wt. % of Al; e) impurity elements of C, N, and O, C in an amount equal to or less than 0.05 wt. %, N in an amount equal to or less than 0.05 wt. %, O in an amount equal to or less than 0.08 wt. %; and f) Ti and inevitable impurities.

The above-described object can also be achieved by providing a super high vacuum vessel having a member suitable for a super high vacuum pressure, said member comprising: a) a Titanium alloy; b) at least one platinum group metal in an amount from 0.02 wt. % to 1.00 wt. % selected from the group consisting of Pd, Pr, Rh, Re, and Os; c) at least one transition metal in an amount ranging from 0.1 wt. % to 3.0 wt. % selected from the group consisting of La, Ce, Pr, Nd, Sm, Gd, Tb, Dy, Ho, Er, and Y; and d) impurity elements of C, N, and O, said C being equal to or less than 0.05 wt. % said N being equal to or less than 0.05 wt. %, and said O being equal to or less than 0.08 wt. %.

The above-described object can also be achieved by providing a super high vacuum vessel having a member suitable for a super high vacuum pressure, said member being a sealing structure comprising: a) a titanium alloy; b) at least one platinum group metal having a content ranging from 0.02 wt. % to 1.00 wt. % selected from the group consisting of Pd, Pt, Rh, Ru, Re, and Os; c) at least one transition metal having a content ranging from 0.1 wt. % to 3.0 wt. % selected from the group consisting of Co, Fe, Cr, Ni, Mn, and Cu; d) at least one rare earth series element having a content ranging from 0.02 wt. % to 0.50 wt. % selected from the group consisting of La, Ce, Pr, Nd, Sm, Gd, Tb, Dy, Ho, Er, and Y; and e) impurity elements of C, N, and O, said C being limited to be equal to or less than 0.05 wt. %, said N being limited to be equal to or less than 0.05 wt. %, said O being limited to be equal to or less than 0.08 wt. %.

BRIEF DESCRIPTION OF THE DRAWINGS

FIGS. 7 (A), 7 (B), and 7 (C) are plan view, longitudinal cross sectional view, and enlarged cross sectional view of a flange shaped shaft coupling in the sealing structure of the super high vacuum vessel.

DESCRIPTION OF THE PREFERRED EMBODIMENTS

Figure 1:
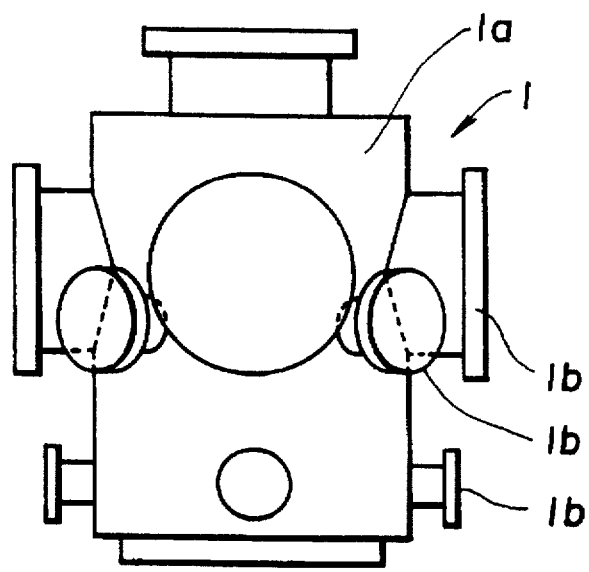
FIG. 1 is a plan view of an example of a structure of a super high vacuum vessel according to the present invention.

Reference will hereinafter be made to the drawings in order to facilitate a better understanding of the present invention.

The present invention is directed to a light weight material suitable for use in a super high vacuum system while avoiding the diffusion of a gas component in solid solution at the vacuum side and discharged from a surface under a super high vacuum pressure. We discovered that such gas discharge can be reduced using a member formulated by adding a predetermined quantity of one or more platinum-group metal, e.g., Pd, Pt, Rh, Ru, Re, and Os, one or more transition metals, e.g., Co, Fe, Cr, Ni, Mn, and Cu, and one or more rare earth metals, e.g., La, Ce, Pr, Nd, Sm, Gd, Tb, Dy, Ho, Er, and Y to a titanium alloy in which C (Carbon), N (Nitrogen), and O (Oxygen) are greatly reduced.

In addition, we discovered that high workability could be obtained by confining the content of such ingredients within a prescribed range. Furthermore, we also discovered that the addition of aluminum in an amount equal to or less than 1.5 wt. % achieves high reinforcement without adverse effect.. If cold workability is not required, Al is added in an amount up to 9.5 wt. % (wt. % is an abbreviation for weight percents) to improve reinforcement. Furthermore, where an α-type, α+β type, or β-type titanium alloy serves as the base alloy, we discovered that hot workability was adversely effected using such an additive series material as described above. We confirmed that when such a raw material was used as the raw material of a super high vacuum vessel, super high vacuum pressures exceeding $10^{-10}$ Torr or $10^{-11}$ Torr can easily be achieved.

The additive elements in the raw material of the super high vacuum vessel are limited to within prescribed ranges for the reasons described below.

Pd (Palladium), Pt (Platinum), Rh (Rhodium), Ru (Ruthenium), Re (Rhenium), and Os (Osmium).

Platinum-group elements act as media for trapping hydrogen in molecular form remaining in the intensities of the material and precipitating it in atomic form. It is necessary to add at least one platinum-group element in a total amount equal to or more than 0.02 wt. %. However, the incupation of platinum-group elements in an amount below 0.02 wt. % reduces workability so that it becomes difficult to cold form the super high vacuum vessel member.

In addition, when employing a titanium alloy base material, hot workability is reduced and it is difficult to work the material if these elements exceed 1.00 wt. %.

Hence, at least one of the above-described elements is added in a range from 0.02 wt. % to 1.00 wt. %.

Co (Cobalt), Fe (Iron), Cr (Chromium), Ni (Nickel), Mn (Manganese), Cu (Copper).

Transition metal elements are necessary to produce an intermetallic compound such as $Ti_2Co$, $TiFe$, $TiCr_2$, $Ti_2Ni$, $TiMn$, or $Ti_2Cu$. Thus, it is necessary to add at least one transition metal element in a total amount of 0.1 wt. % or more to generate the intermetallic compound.

However, if the transition metal element is added in excess of 3.0 st. % the ductility and workability of the material is reduced due to the generated intermetallic compound.

In addition, when employing a titanium (Ti) alloy base material, and the amount of one of transition metal elements exceeds 3.0 wt. %, the hot workability is reduced due to the generated intermetallic compound. Thus, at least one transition metal element is added in a range from 0.1 st. % to 3.0 wt. %.

La (Lanthanum), Ce (Cerium), Pr (Praseodymium), Nd (Neodymium), Sm (Samarium), Gd (Gadolinium), Tb (Terbium), Dy (Dysprosium), Ho (Holmium), Er (Erbium), and Y (Ytterium).

The rare earth series elements serve to suppress diffusion of solid solution oxygen from within a solid body to the surface by fixing the oxygen solid solution in the material through an internal oxidation.

Such action can be derived by adding solely La, Ce, Pr, Nd, Sm, Gd, Tb, Dy, Ho, Er, or Y, or in the form of a complex compound. If a total of 0.02 wt. % or more is added, an effective achievement can be made. However, if one or more rare earth elements are added in a total amount exceeding 0.50 wt. %, a separated (precipitate) oxidation product causes hot dutility and workability to be reduced. Therefore at least one rare earth element is added in a range from 0.02 wt. % to 0.50 wt. %.

C.

It is necessary to reduce C as low as possible to prevent C from combining with oxygen to generate CO gas. However, if the C content is below 0.05 wt. %, the amount of CO gas generated does not significantly influence the vacuum pressure between $10^{-11}$ and $10^{-12}$ Torr. Hence, the content of C is limited to 0.05 wt. % or below.

N.

If N (Nitrogen) is present in the material, it is diffused over the surface and it becomes $N_2$ gas and might be discharged. However, under the vacuum pressure between $10^{-11}$ and $10^{-12}$ Torr, a remarkable reduction of the vacuum pressure by means of $N_2$ gas would not be recognized if the content of N was equal to or below 0.05 wt. %. Hence, the content of N is limited to equal to or less than 0.05 wt. %.

O.

Since O (Oxygen) has a high solid solubility in titanium alloys, O is an impurity which requires close control to avoid discharge in the vacuum atmosphere. If oxygen is discharged in the form of $O_2$, the vacuum pressure can be reduced. Therefore, O (oxygen) is fixed by the addition of one or more elements from among La, Ce, Pr, Nd, Sm, Gd, Tb, Dy, Tb, Ho, Er, and Y as described above. However, if the content of O exceeds 0.08 wt. % in the case where a titanium alloy provides the base material, the hot workability is reduced. Hence, the content of O is limited to equal to or less than 0.08 wt. %.

Al (Aluminum).

A minor addition of Al increases strength without a large change in gas discharge and cold formability. Its effect becomes large especially when Al is added over 0.2 wt. %. However, if Al is added in excess of 1.5 wt. %, cold formability is reduced so that it becomes difficult to work the vacuum vessel or its member. It is desirable for Al to be added in a range from 0.2 wt. % to 1.5 with cold workability taken into consideration. Although it is possible to improve strength by adding Al over 1.5 wt. %, the hot workability is reduced above 9.5 wt. %. Therefore, it is necessary to add Al in a range from 1.5 wt. % to 9.5 wt. %.

Ti (Titanium).

Ti has superior strength, anti-corrosion characteristics, and is light in weight (low in gravity). Ti is used as the base material of the super high vacuum vessel. Furthermore, if a titanium alloy provides the base material, a special limit is placed on the titanium alloy to be applied thereto. The base may include $\alpha$ alloy, near $\alpha$ alloy, $\alpha+\beta$ alloy, or $\beta$ alloy. When such a titanium alloy is used as the base material and the above-described additive series elements are used, the member which is suitable for super high vacuum pressure application without reduction of hot workability.

The titanium alloy includes $\alpha$ and near $\alpha$ alloy; Ti - 0.3 Mo - 0.8 Ni, Ti - 5 Al - 2.5 Sn, Ti - 5 Al - 2.5 Sn - ELI, Ti - 8 Al - 1 Mo - 1 V, Ti - 6 Al - 2 Sn - 4 Zr - 2 Mo, Ti - 6 Al - 2 Nb - 1 Ta - 0.8 Mo, Ti - 2.25 Al - 11 Sn - 5 Zr - 1 Mo, Ti - 5 Al - 5 Sn - 2 Zr - 2 Mo; includes $\alpha+\beta$ alloy; Ti - 6 Al - 4 V, Ti - 6 Al - 4 V - ELI, Ti - 6 Al - 6 Al - 2 Sn, Ti - 8 Mn, Ti - 7 Al - 4 Mo, Ti - 6 Al - 2 Sn - 4 Zr - 6 Mo, Ti - 5 Al - 2 Sn - 2 Zr - 4 Mo - 4 Cr, Ti - 6 Al - 2 Sn - 2 Zr - 2 Mo - 2 Cr, ti - 10 V - 2 Fe - 3 Al, Ti - 3 Al - 2.5 Vr - 2 Mo - 2 Cr, Ti - 10 V - 2 Fe - 3 Al, Ti - 3 Al - 2.5 V; includes $\beta$ alloy; Ti - 13 V - 11 Cr - 3 Al, Ti - 8 Mo - 8 V - 2 Fe - 3 Al, Ti - 3 Al - 8 V - 6 Cr - 4 Mo - 4 Zr, Ti - 11.5 Mo - 6 Zr - 4.5 Sn, and others of $Ti_{0.80 - 0.45} Nb_{0.20 - 0.55}$.

FIGS. 1 through 5 show an example of the super high vacuum vessel to which the present invention is applicable.

Figure 2:
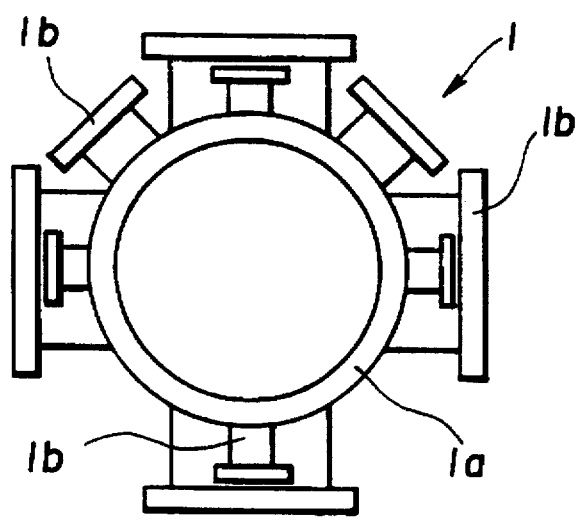
FIG. 2 is an elevation view of an example of a structure of a super high vacuum vessel shown in FIG. 1.

The super high vacuum pressure vessel 1, as shown in FIGS. 1 and 2, comprises a hollow shell portion 1a having a cylindrical shape, major, intermediate, and minor number of flange shaft couplings 1b integrated to the hollow shell portion 1a by means of a welding.

For example, the shell portion 1a has a plate-like raw material formed by U - O bend forming in the cylindrical form and welded in an electronic beam welding and formed with a major, intermediate, and minor number of flange mounting holes. In addition, the flange shaped shaft couplings are manufactured in a flanged cylindrical form by means of plastic working and cutting. Thereafter, the separated shell portion 1a (vessel main body) and separated flange-shaped couplings 1b are integrated with each other such that an electronic beam welding causes a penetration of outer surface of the vessel into the internal of the shell (vessel) portion under an atmosphere of vacuum pressure below $1 \times 10^{-3}$ Torr.

Figure 3:
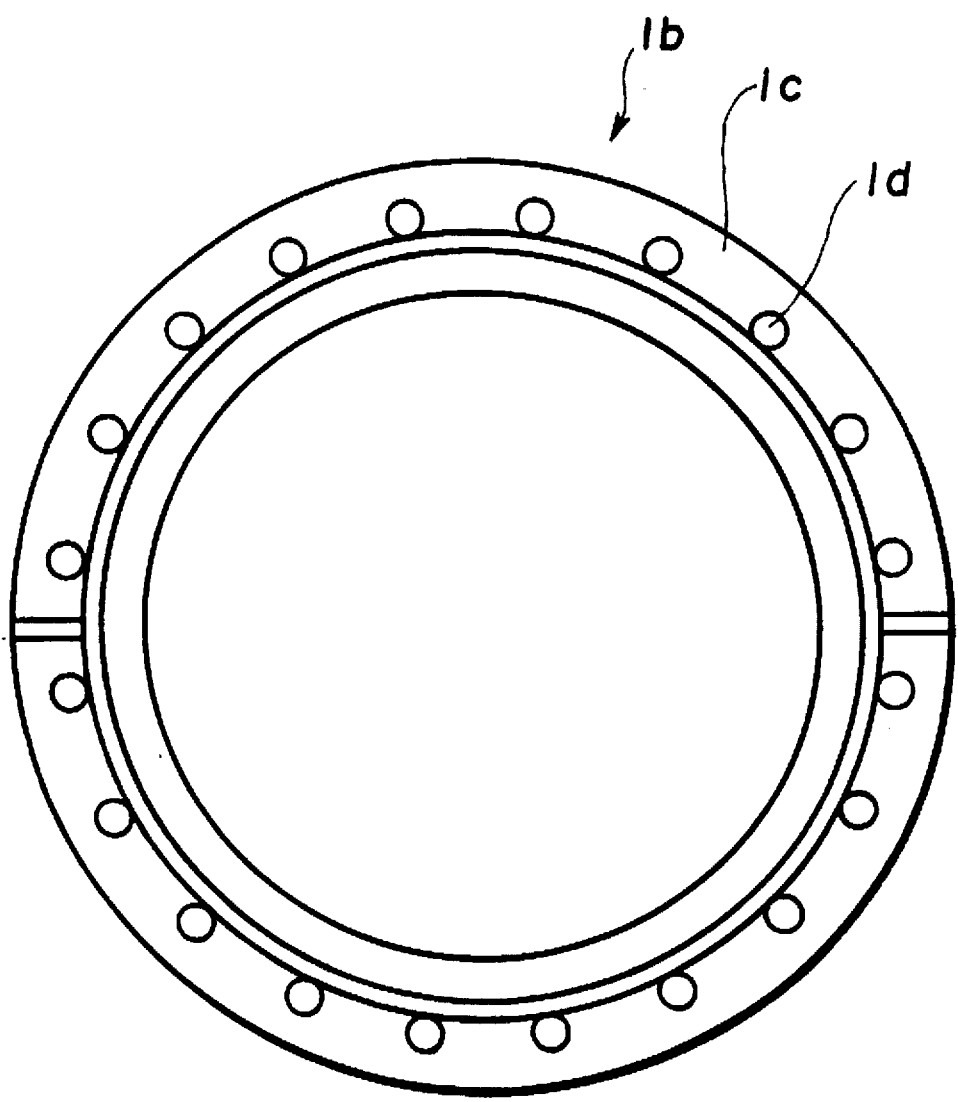
FIG. 3 is a plan view of a flange shaped shaft coupling of the super high vacuum vessel.
Figure 4:
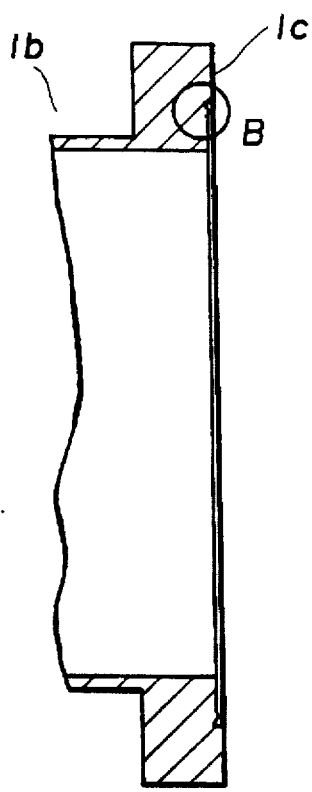
FIG. 4 is a cross sectional view of the flange shaped shaft coupling of the super high vacuum vessel.
Figure 5:
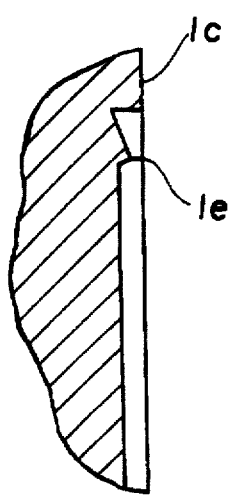
FIG. 5 is an enlarged cross sectional view of a knife edge portion at a position denoted by B in FIG. 4.
Figure 6C:
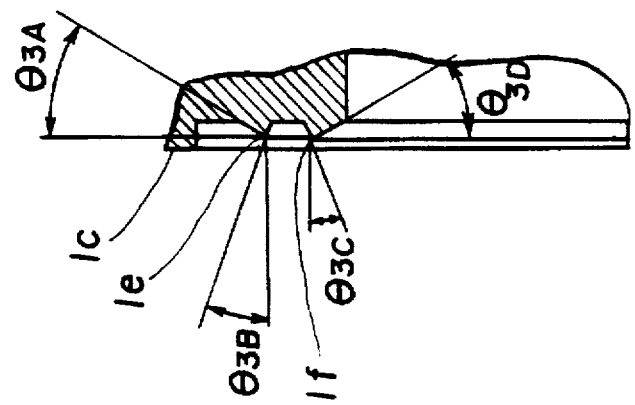
FIGS. 6 (A), 6 (B), and 6 (C) are plan view, longitudinal cross sectional view, and enlarged cross sectional view of a flange shaped shaft coupling in a sealing structure of the vacuum vessel according to the present invention.
Figure 6B:
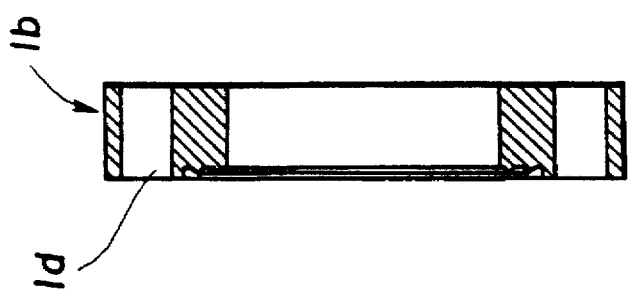
Figure 6A:
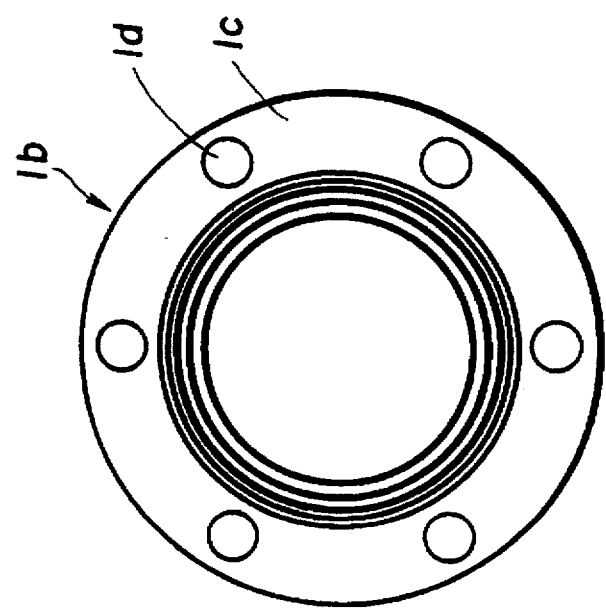
Figure 8C:
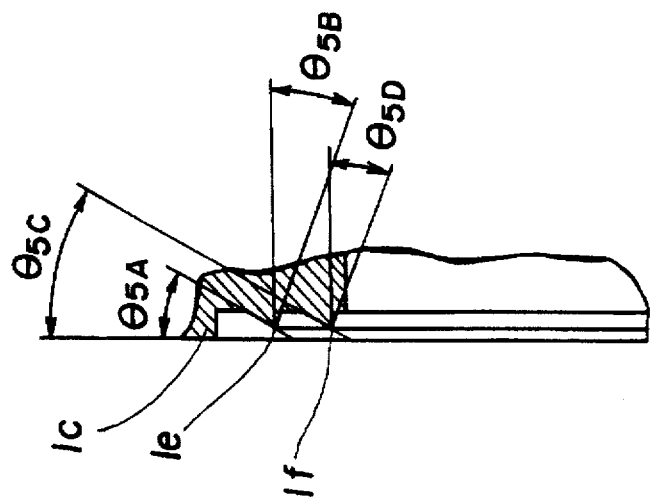
FIGS. 8 (A), 8 (B), and 8 (C) are plan view, longitudinal cross sectional view, and enlarged cross sectional view of the flange shaped shaft coupling in the sealing structure of the super high vacuum vessel according to the present invention.
Figure 8B:
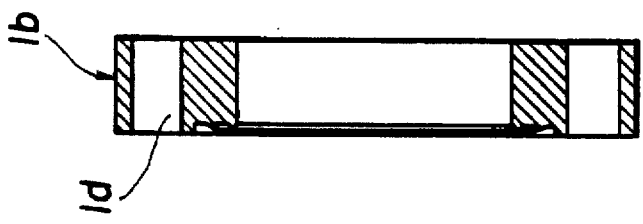
Figure 8A:
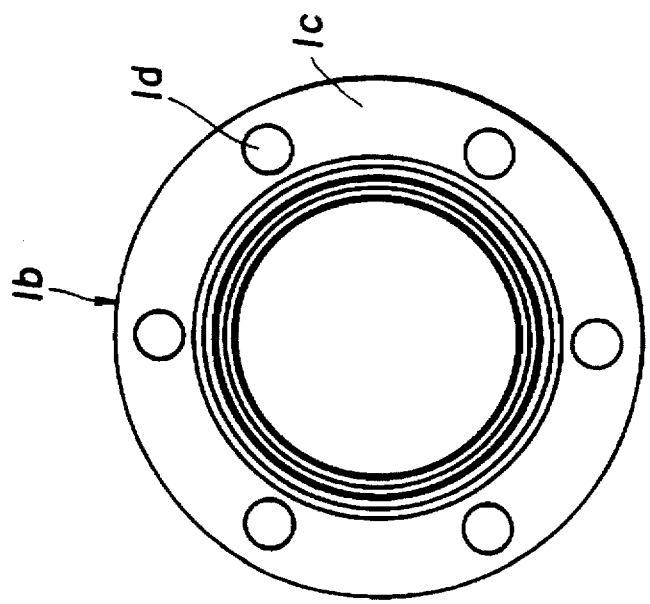

A multiple number of bolt holes 1d which penetrate into a coupling surface 1c are formed on the flange shaped shaft coupling 1b, as shown in FIGS. 3 to 5.

On the coupling surface 1c, a ring shaped knife edge portion 1e is formed to provide a preferable vacuum sealing. It is desirable that a film of 0.01 μm to 2.00 μm made of Au is applied to a surface of the knife edge portion 1e to prevent oxidation, as by sputtering. Similarly, surface treatment of TiN (titanium nitride) for prevention of oxidation and surface wear is preferably conducted on the surface of the knife edge portion 1e.

In addition, as a sealing packing material to be contacted against the knife edge portion 1e, a high purity Ti may be used. The impurity content of Ti being constituted by O: equal to or less than 0.08 wt. %; H: equal to or less than 0.001 wt. %; Fe: equal to or less than 0.042 wt. %; C: equal to or less than 0.006 wt. %; and N: equal to or less than 0.005 wt. %. Furthermore, on at least part of outer surface of the vessel 1, at least one of oxidation film or nitrogen film may preferably be attached.

If a stainless steel is used as the raw material of the super high vacuum vessel, as is conventional, a gas remains in the inside of the vacuum vessel, i.e., an oxidation gas dissolved in the stainless steel; hydrogen gas trapped on a matrix interface and intermediate matter; and CO and $CO_2$ gasses coupled to the carbon in the steel with an oxygen remaining in a surface deteriorated layer. On the other hand, in the present invention, the member suitable for the super high vacuum pressure comprises a titanium alloy to which reduced C, N, and O, a platinum-series metal of Pd, transition metal of Co, and a rare earth series element such as Y or meshed metal are added by a predetermined quantity, the gas discharge is suppressed and the remaining gas is fixed, preferably by the following mechanisms:

(1) The discharge of oxygen from the inside of the titanium alloy constituting the member suitable for the super high vacuum pressure is fixed and reduced in the interstices of the material in the form of oxide by means of the rare earth series element such as Y or meshed metal.

(2) $H_2$ gas is adsorbed on the surface of the material in the form of hydrogen atoms by catalytic action of the platinum-group metal such as Pd.

(3) The adsorbed H atoms are strongly fixed by means of an intermetallic compound such as $(TiO_2Co)$ having a high hydrogen trapping ability.

Therefore, an appropriate quantity of respective added elements provide a gas discharge characteristic for the member suitable for super high vacuum pressure application having desirable cold formability.

Furthermore, if Al is added in an amount equal to or less than 9.5 wt. %, improved hot workability and strength are achieved without loss of the gas discharge characteristic.

Preferably, Al is added in an amount equal to or less than 1.5 wt. %. Furthermore, if a titanium alloy is used as the base material, and the above disclosed alloying elements are added, the member of the super high vacuum vessel exhibits superior gas discharge characteristics without reduced hot workability.

(First Embodiment)

After the alloy of the composition described in Table 1 and Table 2 was melted in a bottom ingot through an arc melting furnace and underwent the hot rolling and thermal processing, various kinds of tests were conducted.

No. 1 to No. 9 of Table 1 represent a first preferred embodiment according to the present invention.

No. 10 to No. 18 of Table 2 represent comparison example 1. No. 19 of Table 2 was a reference example of the first embodiment.

No. 20 of Table 2 is a conventional example 1 in the case where the member is constituted by an austenitic stainless steel.

For these specimens, gas discharge characteristics and mechanical properties were measured.

To test the gas discharge characteristics, a temperature-up desorption system (TDS) was used to increase and heat the specimens to effect baking and, thereafter, the discharge rate of gas at a room temperature was derived. The gas discharge rate was derived by a measured strength from a quadruple pole mass analyzer (QMS) multiplied by a sensitivity coefficient for each air, and evacuation speed for each air and gave a ratio value with respect to the reference value of conventional example of No. 20.

Furthermore, for a part of the specimens, a plate material was used as a specimen through a VAR ingot. A small-sized super high vacuum vessel 1 having the structure shown in FIGS. 1 to 5 was manufactured so that vacuum pressure testing was carried out by means of a turbo molecular pump (180 l/s). In addition, the flange-shaped shaft coupling 1b manufactured by the cold plastic forming was subjected to a limit bending test as an index of cold formability and arranged by a bending factor bend paunch radius/plate thickness. A tensile strength for each specimen was carried out to compare each tensile strength. Table 3 and Table 4 show the result of tests for each specimen.

As apparent from Table 3, specimens No. 1 to No. 9 in the first embodiment 1 had gas discharge characteristics of any one of $H_2$, $CO+N_2$, $CO_2$, 1/10 or below as compared with those of the austenitic stainless steel of No. 20. Especially, $CO+N_2$ gas of the mass number 28 were very slightly discharged. In addition, cold formability was extremely high and no cracks were generated at a bending radius equal to or approximate to the plate thickness.

Furthermore, for the specimens of Nos. 1, 3, 4, 6, 8, and 9 to which Al was added in a range from 1.5 wt. %, tensile strength values exceeding 45 Kgf/mm$^2$ were obtained. It was confirmed that for the specimens of No. 10 to No. 19, the comparison example 1, the gas discharge characteristic or workability was inferior.

Although specimen No. 10 is an example in which a quantity of platinum-group metal was less than the range recited in the present invention, the cold workability was superior but the gas discharge characteristic was not so superior.

Although the specimen of No. 11 is an example in which the platinum-group metal was added in an amount exceeding the range recited in the present invention, and exhibited superior gas discharge characteristics, it was confirmed that specimen No. 11 exhibited inferior cold workability as the bending factor was 5.5.

Specimens No. 12 and No. 13 were examples in which the quantity of the transition metal was outside of the range recited in the present invention. Specimen No. 12, in which the transition metal was added in excess of the minimum quantity of the range recited in the present invention, exhibited reduced workability. Specimen No. 13, in which the quantity of the transition metal was less than the minimum of the range recited in the present invention, it was confirmed that the gas discharge rate was not remarkably less than that of the stainless steel of No. 20.

In specimens No. 14 and No. 15, the quantity of the rare earth series element including Y was outside of the range recited in the present invention. For specimen No. 14, a gas component including oxygen was largely discharged and the gas discharge characteristic was substantially merely equal to that in the case of the stainless steel. For specimen No. 15, the workability was reduced due to the generated oxide and the gas discharge characteristic was deteriorated.

Specimens No. 16, No. 17 and No. 18 were examples in which C, N, and O were present in amounts exceeding the range recited in the present invention. In each case, the gas discharge characteristic was remarkably reduced as substantially equal to that in the case of the stainless steel.

Specimen No. 19 was an example in which the Al content exceeded the range to secure the cold workability. Although the gas discharge characteristic was superior, cold formability was inferior.

In accordance with the present invention, a super high vacuum vessel ($\phi 200 \times 300$) was made using the material of No. 1 in the first embodiment, and a super high vacuum pressure of $6.8 \times 10^{-11}$ Torr was obtained by means of only the turbo pump of 180 l/s. This result indicated that the remarkable difference existed from $1.0 \times 10^{-8}$ Torr in the case of the stainless steel made super high vacuum vessel. It was recognized that the member used in the present invention and suitable for the super high vacuum vessel application gave superior gas discharge characteristics. It is noted that the experiments on the reached vacuum pressures were carried out after baking for 200° C.×72 hours and after 24-hour cooling at the room temperature.

(Second Embodiment 2, Comparison Example 2)

In the second preferred embodiment and comparison example 2, a titanium alloy was used as a base material, the alloy including the added elements excepting Al. The alloy having the composition shown in Table 5 and Table 6 was melted in the arc solution furnace in the form of the button ingot, and, after hot rolling and thermal processing were performed, various types of tests were conducted.

Figure 11A:
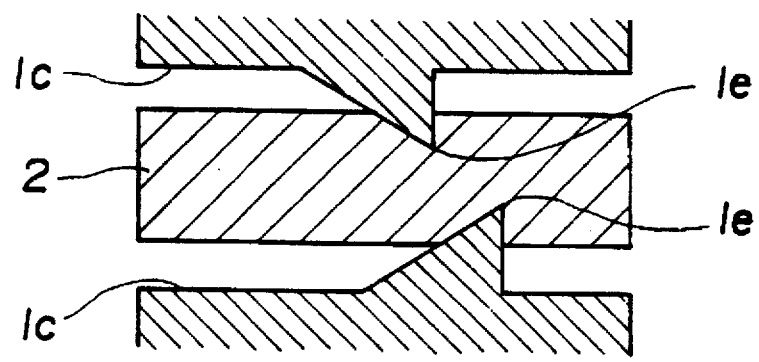
FIGS. 11 (A), 11 (B), and 11 (C) are cross sectional views of the conventional example of the vacuum vessel for comparing a gas discharge situation of the conventional example.
Figure 11B:
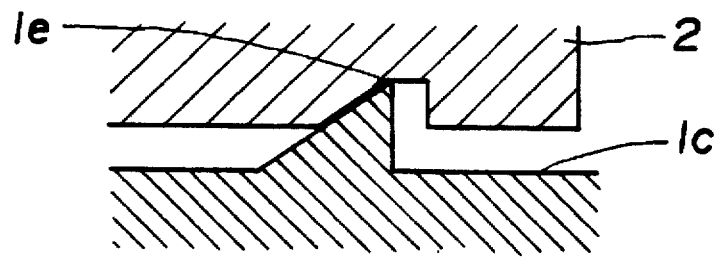
Figure 11C:
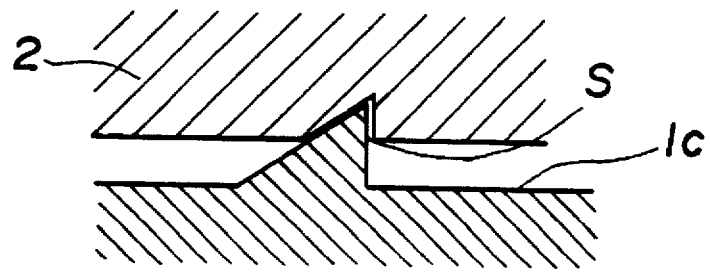

Specimens No. 21 to 25 represent the second preferred embodiment; specimens No. 26 to No. 34 of Table 6 are comparison examples 2, and specimen No. 35 is a conventional example of the austenitic stainless steel shown in FIGS. 11 (A) through 11 (C). The gas discharge characteristic and mechanical properties of these specimens were measured.

For the test on the gas discharge characteristic, the same values were used in the same way as in the case of the first embodiment 1 and for a part of the specimens, the gas discharge characteristics were tested with the tested specimens formed in the plate material through the VAR ingot and the small-sized super high vacuum vessel 1 was manufactured with the structure shown in FIGS. 1 to 5 and that tests were carried out using the turbo molecular pump (800 l/s). In addition, with the manufacture of the flange shaped shaft coupling 1b by means of the cutting using a lathe turning machine and/or milling cutting machine taken into consideration, a degree of cracking of the specimens after the hot rolling as an index of the hot workability was measured and the hot workability evaluated. These results were shown in Table 7 and Table 8.

As appreciated from Table 7, specimens No. 21 to No. 25 of the second embodiment 2 have a gas discharge rate of $1/10$ that of the case where the specimen was austenitic stainless steel of No. 35 for either gas of $H_2$, $CO+N_2$, and $CO_2$. $CO+N_2$ gas provided a very slight quantity of the mass number 28. In addition, the hot formability was preferable and, if the cracking occurred, its length was within 1 cm. It was confirmed that in specimens No. 26 to No. 34 the gas discharge characteristic and hot workability were inferior. Specimen No. 26 is an example in which the quantity of the platinum-group metal was less than the range recited in the present invention and it was confirmed that, although its hot workability was superior, its gas discharge characteristic was not inferior.

Specimens No. 27, 28, and 30 indicate the composition of the platinum-group metal, transition metal, and rare earth series element exceeded the range recited in the present invention. Although they exhibited preferable gas discharge characteristics, the degrees of cracks were large and were difficult to undergo the hot workability.

Specimens No. 32, 33, and 34 were examples in which C, N, and O exceeded the ranges recited in the present invention. In each case, it was confirmed that the gas discharge rate was remarkably reduced as comparable to the stainless steel.

Figure 9C:
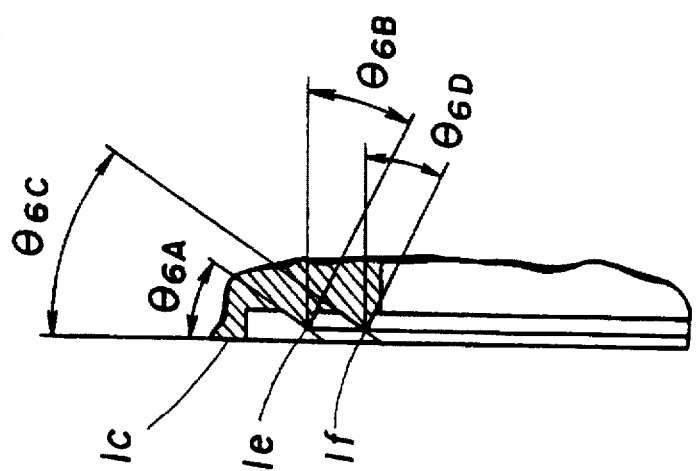
FIGS. 9 (A), 9 (B), and 9 (C) are plan view, longitudinal cross sectional view, and enlarged cross sectional view of the flange shaped shaft coupling in the sealing structure of the super high vacuum vessel according to the present invention.
Figure 9B:
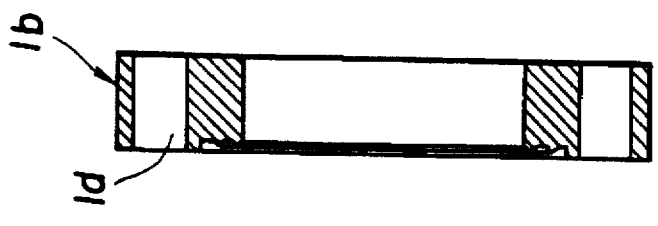
Figure 9A:
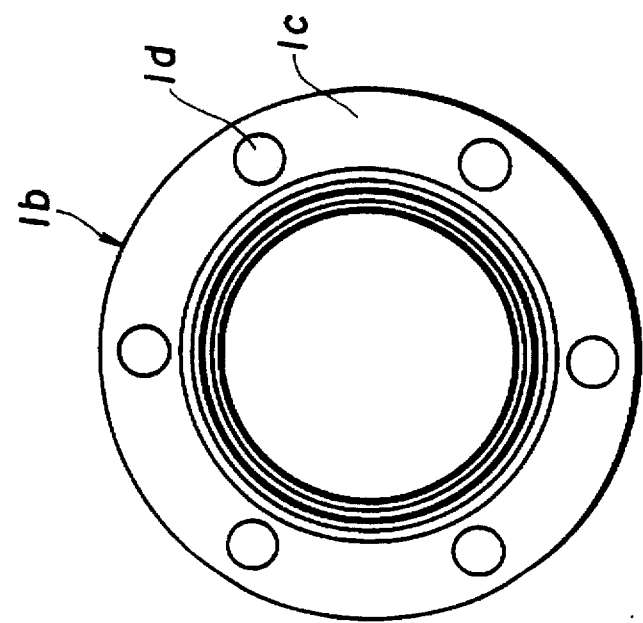

Table 9 shows the results of specimens of the super high vacuum vessels ($\phi 200 \times 300$) 1 having the sealing structures shown in FIGS. 9 (A) to 10 (C) and evacuated to a high vacuum pressure using only the turbo pump (180 l/s).

Figure 10C:
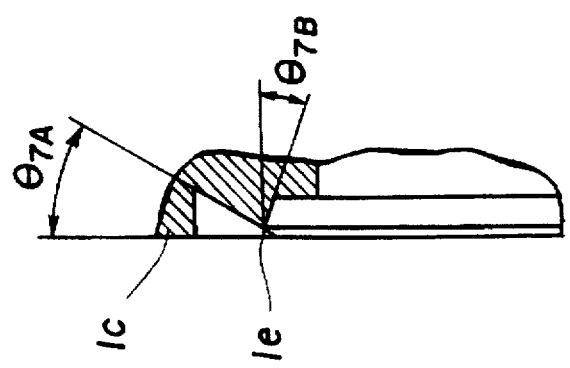
FIGS. 10 (A), 10 (B), and 10 (C) are plan view, longitudinal cross sectional view, and enlarged cross sectional view of another flange shaped coupling in another sealing structure of a conventional example denoted by No. 35 of Table 8 and shown in Tables 9 and 10.
Figure 10B:
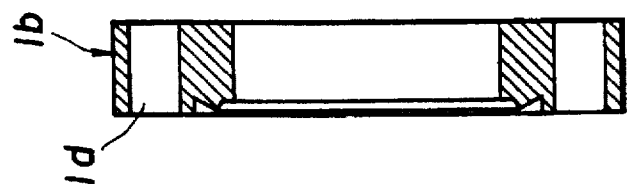
Figure 10A:
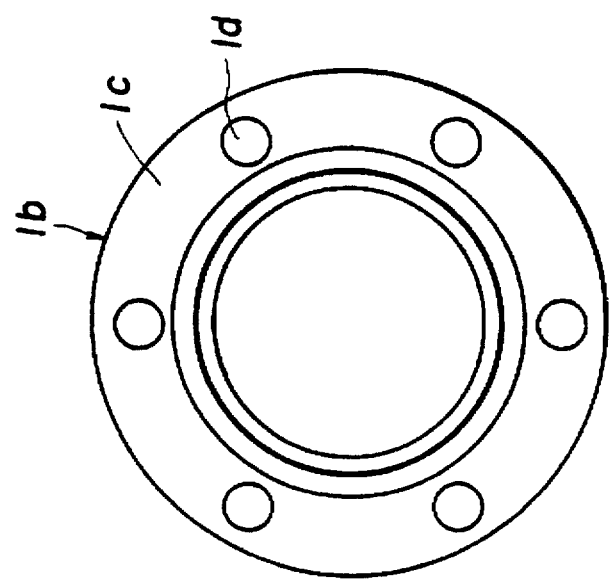

FIGS. 10 (A) to 10 (C) show an example of the sealing structure in the comparison example in Table 9. As shown in FIGS. 10 (A) to 10 (C), a ring-shaped single knife edge 1e was formed on a sealing surface 1c, a tip end R (radius of curvature) of the sealing edge portion 1e being formed to indicate 0.1 and tilted angle $\phi_{7A}$ of the outside of the knife edge portion 1e being 30° and tilted angle $\phi_{7B}$ of the inside of the knife edge portion 1e being 20°.

As appreciated from Table 9, where the sealing structure of any one of FIGS. 6(A) to 10(C) was adopted, gas leak was not generated at $6 \times 10^{-11}$ Torr. However, a slight gas leak was not generated where the sealing structure of FIGS. 9 (A) through 9 (C) was adopted. However, a reached vacuum pressure was relatively large as compared with the super high vacuum vessel made of the same stainless steel. The experiments were carried out after heating at 370° C.×48 hours, and thereafter, cooling for 24 hours at the room temperature.

Table 10 shows the result of experiments in which the super high vacuum vessels ($\phi 200 \times 300$) 1 were sampled having the sealing structures shown in FIGS. 6 (A) through 10 (C) using the materials of No. 21 through No. 24 of the second embodiment 2 and evacuated using the turbo molecular pump (180 l/s). As shown in Table 10, gas leakage was not generated at the vacuum pressure of $6 \times 10^{-11}$ Torr where the sealing structures shown in FIGS. 6 (A) through 10 (C) were adopted. However, in the case where the sealing structure shown in FIGS. 10 (A) through 10 (C) was adopted, a slight gas leak or like was generated. As shown in Table 10, the vacuum pressure was remarkably high as compared with where the stainless steel was used having the vacuum pressure exceeding $1.0 \times 10^{-8}$ Torr.

The vacuum pressures reached were tested under heating at 370°×48 hours and, thereafter, cooled for 24 hours at the room temperature.

FIGS. 6 (A) through 10 (C) show sealing structures applicable to the vacuum vessel shown in FIG. 1. As shown in FIGS. 6 (A) through 6 (C), a multiple number of bolt holes 1d penetrated through the sealing surface 1c are formed on each flange shaped shaft coupling 1b. Double knife edge portions 1e, 1f in the ring shape are concentrically formed on the sealing surface 1c so as to provide a tight sealing structure. Then, tip ends R (radius of curvature) of the knife edge portions 1e, 1f were formed to indicate 0.06, an outer tilt angle of the outer knife edge portion 1e indicated 30° and inner tilt angle $\phi_{3C}$ indicated 20°. In addition, an inner tilt angle $\phi_{3D}$ indicated 30°.

It is preferred that at least one surface of either knife edge portion 1e, 1f is coated with Au film or Ag film having a thickness in a range from 0.01 μm to 2.00 μm by means of, e.g., sputtering, to prevent oxidation. It is also preferred that at least one surface of either knife edge portion 1e, 1f is treated with TiN for preventing oxidation or wear. As a sealing gasket material attached under pressure to the knife edge portions 1e, 1f, a high purity Ti of O: equal to 0.042 wt. % or less, H: equal to 0.001 wt. % or less, Fe: equal to 0.042 wt. % or less, C: 0.006 wt. % or less, N: 0.005 wt. % or less may be used or non-oxygen Copper may alternatively be used. Furthermore, it is preferred that a surface treatment such as Au or Ag may be carried out on the surface of the sealing gasket material.

On at least a part of the outer surface of the vacuum vessel, a protective film may be applied which is selected from either an oxidation film or nitride film.

FIGS. 7 (A) through 7 (C) show another example of the sealing structure. Double knife edge portions 1e, 1f in the ring shape were formed concentrically on the sealing surface 1c so as to provide the tight vacuum sealing structure. The tip ends R of the knife edge portions 1e, 1f were formed to indicate 0.03, with the outer tilt angle $\phi_{4A}$ on the outer knife edge portion 1e indicated 20° and inner tilt angle $\phi_{4B}$ indicated 30°. An outer tilt angle $\phi_{4C}$ on the inner knife edge portion 1f indicated 20° and inner tilt angle $\phi_{4D}$ indicated 30°. An appropriate surface treatment can be carried out in the same way as shown in FIGS. 6 (A) through 6 (C).

FIGS. 8 (A) through 8 (C) integrally show still another example of the sealing structure. In the case of example shown in FIGS. 8 (A) through 8 (C), the tip ends R of the knife edge portions 1e and 1f indicate 0.1, with the outer tile angle $\phi_{5A}$ indicated 30° and inner tilt angle $\phi_{5B}$ indicated 20°. Then, the outer tilt angle $\phi_{5C}$ on the inner knife edge portion 1f indicated 30° and inner tilt angle $\phi_{5D}$ indicated 20°. It is possible to make a surface treatment as in the same way as shown in FIGS. 6 (A) through 6 (C).

FIGS. 7 (A), 7 (B), and 7 (C) show still another example of the sealing structure. The tip ends R of the knife edge portions 1e, 1f indicate 0.03, with the outer tile angle $\phi_{6A}$ at the outer knife edge portion 1e indicated 35° and inner tilt angle $\phi_{6B}$ indicated 25° and with the outer tilt angle $\phi_{6C}$ of the inner knife edge portion 1f indicated 35° and inner tilt angle $\phi_{6D}$ indicated 25°. An appropriate surface treatment may be possible in the same way as shown in FIGS. 6 (A) through 6 (C).

FIGS. 11 (A) through 11 (C) show conventional example in which the stainless steel was used for the member of sealing structure. In FIGS. 11 (A) through 11 (C), the single circular knife edge portion 1e was only formed on the sealing surface 1c. If a large difference in thermal expansion coefficients between the vessel member and sealing gasket 2 is present (for example, the thermal expansion coefficient of the gasket member 2 is larger than that of the vessel member 1, a gap or clearance S is formed so as to generate a gas leakage when the vacuum vessel is assembled as shown in FIG. 11 (A), when the heating process is passed as shown in FIG. 11 (B), and when the cooled state is resulted as shown in FIG. 11 (C).

Figure 12:
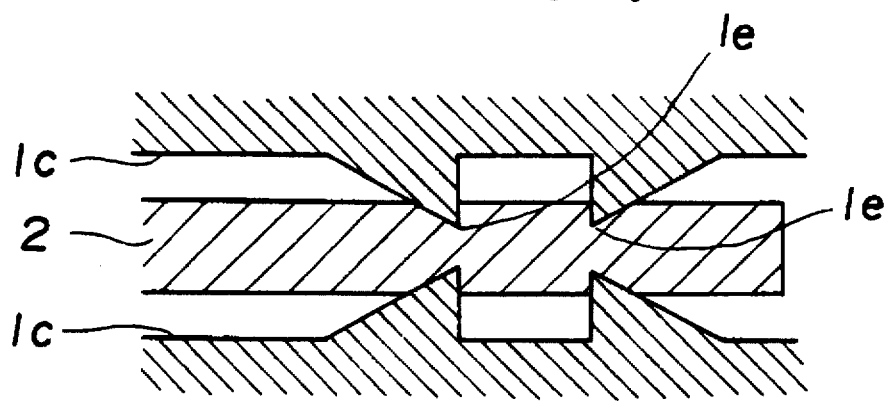
FIGS. 12 (A), 12 (B), and 12 (C) are cross sectional views of the sealing structure in the case of the preferred embodiment according to the present invention for comparing no gas discharge situation with that of the conventional example shown in FIGS. 11 (A) to 11 (C).
Figure 12:
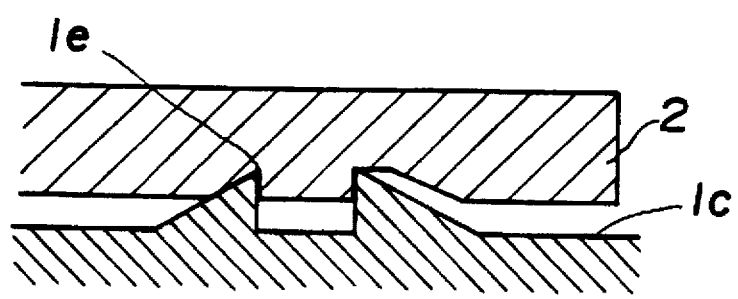
Figure 12:
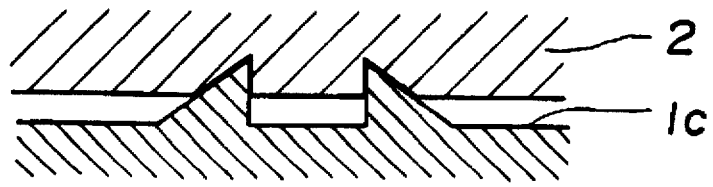

FIGS. 12 (A) through 12 (C) show the sealing structure in the case of the present invention. Since, as shown in FIGS. 12 (A) through 12 (C), at least double circular knife edge portions 1e, 1f are formed concentrically on the sealing surface 1c, no clearance was formed even if the large difference in the thermal expansion coefficient between the vacuum vessel member and sealing gasket member 2 is present (for example, the thermal expansion coefficient in the case of the gasket member 2 is larger) when the vacuum vessel is assembled as shown in FIG. 12 (A), when the heating process is passed as shown in FIG. 12 (B), and when the cooled state is present in the vacuum vessel shown in FIG. 12 (C). Consequently, no gas leakage occurs and the super high vacuum pressure over $10^{-10}$ Torr or over $10^{-11}$ Torr was obtained and maintained.

As described hereinabove, the super high vacuum vessel can be achieved having the vacuum pressure over $10^{-10}$ or over $10^{-11}$ Torr using the simple evacuation system such as the turbo pump without use of the complicated titanium supplemation pump or cryopump. In addition, it is possible to provide the light-weight vacuum vessel using the member suitable for the super high vacuum pressure application with extremely less gas leakage. Such a super high vacuum pressure can be maintained.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

TABLE 1

| No. | Pt-SERIES METAL | TRANSITION METAL | RARE EARTH ELEMENT | C | N | O | Al | REMARKS |
| --- | --- | --- | --- | --- | --- | --- | --- | --- |
| 1 | 0.25Pd | 1.9Co | 0.16Y | 0.02 | 0.02 | 0.06 | 0.5 | 1st |
| 2 | 0.62Pd | 1.0Co | 0.42Y | 0.04 | 0.03 | 0.05 | — | EMBODIMENT |
| 3 | 0.85Pd | 2.6Co | 0.03Y | 0.02 | 0.04 | 0.06 | 1.1 | |
| 4 | 0.04Pd | 0.3Co | 0.33Mm* | 0.03 | 0.02 | 0.07 | 0.8 | |
| 5 | 0.09Pt | 0.15Ni | 0.15Nd | 0.04 | 0.03 | 0.08 | — | |
| 6 | 0.15Ru | 2.32Cr | 0.27Ce | 0.02 | 0.04 | 0.08 | 0.6 | |
| 7 | 0.91Re | 0.6Fe | 0.25Tb 0.13Sm | 0.03 | 0.01 | 0.07 | — | |
| 8 | 0.20Pd 0.15Pt | 1.4Cu | 0.33Dy | 0.03 | 0.02 | 0.06 | 0.4 | |
| 9 | 0.48Rh | 2.1Mn 0.15Fe | 0.22La 0.08Y | 0.02 | 0.04 | 0.05 | 0.9 | |

REMARKS
*Mm: MESHED METAL

TABLE 2

| No. | Pt-SERIES METAL | TRANSITION METAL | RARE EARTH ELEMENT | C | N | O | Al | REMARKS |
| --- | --- | --- | --- | --- | --- | --- | --- | --- |
| 10 | 0.01Pd | 2.2Co | 0.08Y | 0.04 | 0.03 | 0.06 | 0.6 | COMPARISON |
| 11 | 1.32Pd | 1.4Ni | 0.25La | 0.03 | 0.02 | 0.06 | 0.3 | EXAMPLE 1 |
| 12 | 0.42Pt | 3.9Co | 0.42Mm* | 0.05 | 0.03 | 0.07 | — | |
| 13 | 0.20Ru | 0.03Ni | 0.16Y | 0.05 | 0.05 | 0.06 | — | |
| 14 | 0.36Pt | 2.2Cu | 0.01Y | 0.03 | 0.03 | 0.08 | 1.1 | |
| 15 | 0.47Pd | 1.7Fe | 0.69Tb | 0.04 | 0.02 | 0.08 | 0.3 | |
| 16 | 0.14Ru | 1.2Co | 0.14La | 0.08 | 0.03 | 0.07 | 0.4 | |

TABLE 2-continued

| No. | Pt-SERIES METAL | TRANSITION METAL | RARE EARTH ELEMENT | C | N | O | Al | REMARKS |
|---|---|---|---|---|---|---|---|---|
| 17 | 0.73Pt | 0.6Cr 1.4Mn | 0.37Ce | 0.05 | 0.07 | 0.06 | 0.2 | |
| 18 | 0.64Pd | 1.0Fe | 0.14Y | 0.03 | 0.02 | 0.11 | — | |
| 19 | 0.29Pd | 1.2Ni 2.2Co | 0.28Mm* | 0.02 | 0.01 | 0.06 | 1.7 | EXAMPLE OF 1st EMBODIMENT |
| 20 | 18Cr—9.2Ni | | | 0.02 | <0.01 | <0.01 | <0.01 | CONVENTIONAL EXAMPLE 1 |

REAMRKS
*Mm: MESHED METAL

TABLE 3

| | GAS DISCHARGE-ABILITY RATIO | | | BENDING | TENSILE STRENGTH | RE- |
|---|---|---|---|---|---|---|
| No. | $H_2$ | $CO+N_2$ | $CO_2$ | FACTOR | (kgf/mm$^2$) | MARKS |
| 1 | 0.06 | <0.001 | <0.001 | ≦1.0 | 49 | 1st |
| 2 | 0.07 | 0.002 | 0.002 | ≦1.0 | 36 | EMBODI- |
| 3 | 0.07 | 0.002 | <0.001 | ≦1.0 | 52 | MENT |
| 4 | 0.12 | <0.001 | 0.002 | ≦1.0 | 50 | |
| 5 | 0.09 | 0.003 | 0.003 | ≦1.0 | 33 | |
| 6 | 0.04 | 0.002 | 0.002 | ≦1.0 | 48 | |
| 7 | 0.07 | 0.002 | 0.003 | ≦1.0 | 38 | |
| 8 | 0.04 | 0.003 | 0.004 | ≦1.0 | 46 | |
| 9 | 0.10 | 0.003 | 0.005 | ≦1.0 | 52 | |

TABLE 4

| | GAS DISCHARGE-ABILITY RATIO | | | BEND-ING | TENSILE STRENGTH | |
|---|---|---|---|---|---|---|
| No. | $H_2$ | $CO+N_2$ | $CO_2$ | FACTOR | (kgf/mm$^2$) | REMARKS |
| 10 | 0.53 | 0.62 | 0.60 | ≦1.0 | 47 | COM- |
| 11 | 0.02 | 0.007 | 0.004 | 5.5 | 48 | PARISON |
| 12 | 0.09 | 0.005 | 0.004 | 4.8 | 49 | EXAMPLE 1 |
| 13 | 0.83 | 0.31 | 0.30 | ≦1.0 | 35 | |
| 14 | 0.10 | 0.85 | 0.80 | ≦1.0 | 48 | |
| 15 | 0.20 | 0.33 | 0.32 | 3.3 | 46 | |
| 16 | 0.13 | 1.03 | 0.98 | ≦1.0 | 53 | |
| 17 | 0.12 | 1.02 | 0.03 | ≦1.0 | 54 | |
| 18 | 0.11 | 0.95 | 0.86 | ≦1.0 | 59 | |
| 19 | 0.08 | 0.004 | 0.003 | 2.7 | 57 | EXAMPLE OF 1st EMBODIMENT |
| 20 | 1.0 | 1.0 | 1.0 | — | — | CONVENTIONAL EXAMPLE 1 |

TABLE 5

| No. | Al | V | Sn | Zr | Mo | Nb | Pt-SERIES METAL | TRANSITION METAL | RARE EARTH SERIES ELEMENT | C | N | O | REMARKS |
|---|---|---|---|---|---|---|---|---|---|---|---|---|---|
| 21 | 2.9 | 2.6 | — | — | — | — | 0.27Pd | 2.0Co | 0.16Y | 0.02 | 0.01 | 0.06 | 2nd |
| 22 | 6.1 | 4.3 | — | — | — | — | 0.63Pt | 0.8Mn | 0.23Nd | 0.03 | 0.02 | 0.05 | EMBODIMENT |
| 23 | 6.1 | — | 2.1 | 3.9 | 2.0 | — | 0.04Pd | 0.34Fe 0.2Ni | 0.41La | 0.02 | 0.03 | 0.05 | |
| 24 | 5.1 | — | 2.6 | — | — | — | 0.90Re | 2.4Cr | 0.28Mm* | 0.03 | 0.04 | 0.08 | |
| 25 | — | — | — | — | — | 55 | 0.13Re 0.36Pd | 2.0Cu | 0.18Tb | 0.02 | 0.02 | 0.07 | |

REMARKS
*Mm: MESHED METAL, OTHERS: H ≦ 20 ppm

TABLE 6

| No. | Al | V | Sn | Zr | Mo | Nb | Pt-SERIES METAL | TRANSITION METAL | RARE EARTH SERIES ELEMENT | C | N | O | REMARKS |
|---|---|---|---|---|---|---|---|---|---|---|---|---|---|
| 26 | 3.2 | 2.5 | — | — | — | — | 0.01Pd | 1.9Fe | 0.04Y | 0.02 | 0.01 | 0.06 | |
| 27 | 6.2 | 4.1 | — | — | — | — | 1.51Pt | 0.32Mo | 0.08La | 0.01 | 0.02 | 0.06 | |
| 28 | 5.2 | — | 2.6 | — | — | — | 0.06Rh | 4.8Co | 0.36Dy | 0.02 | 0.01 | 0.05 | |
| 29 | 6.2 | 4.0 | — | — | — | — | 0.03Pd | 0.08Fe | 0.08Ce | 0.01 | 0.02 | 0.08 | |
| 30 | 3.1 | 2.6 | — | — | — | — | 0.16Pt | 1.3Co | 0.61Y | 0.01 | 0.01 | 0.07 | |
| 31 | 3.3 | 2.6 | — | — | — | — | 0.57Pd | 0.7Cr | 0.01La | 0.01 | 0.02 | 0.06 | |
| 32 | 3.0 | 2.6 | — | — | — | — | 0.70Pt | 1.4Mn | 0.21Mm* | 0.10 | 0.02 | 0.07 | |
| 33 | 6.3 | 4.1 | — | — | — | — | 0.09Pd | 2.1Co | 0.36Sm | 0.02 | 0.25 | 0.08 | |
| 34 | 3.2 | 2.4 | — | — | — | — | 0.17Pt | 0.3Cr 1.5Ni | 0.19Er | 0.02 | 0.05 | 0.19 | |
| 35 | 18Cr—8.8Ni | | | | | | | | | <0.01 | <0.01 | <0.01 | CONVENTIONAL EXAMPLE 2 |

REMARKS
*Mm: MESHED METAL, OTHERS: H ≦ 20 ppm

TABLE 7

| No. | GAS DISCHARGEABLITY RATIO | | | CRACKS DURING HOT ROLLING FORM | REMARKS |
|---|---|---|---|---|---|
| | $H_2$ | $CO + N_2$ | $CO_2$ | | |
| 21 | 0.06 | <0.001 | <0.001 | NO | 2nd EMBODIMENT |
| 22 | 0.05 | 0.002 | 0.001 | MINOR | |
| 23 | 0.05 | 0.003 | 0.005 | MINOR | |
| 24 | 0.08 | 0.001 | 0.002 | NO | |
| 25 | 0.04 | 0.003 | 0.003 | NO | |

TABLE 8

| No. | GAS DISCHARGEABLITY RATIO | | | CRACKS DURING HOT ROLLING FORM | REMARKS |
|---|---|---|---|---|---|
| | $H_2$ | $CO + N_2$ | $CO_2$ | | |
| 26 | 0.48 | 0.063 | 0.66 | NO | COMPARISON EXAMPLE 2 |
| 27 | 0.03 | 0.002 | 0.001 | MAJOR | |
| 28 | 0.02 | 0.005 | 0.001 | MAJOR | |
| 29 | 0.63 | 0.57 | 0.59 | MINOR | |
| 30 | 0.04 | 0.002 | 0.001 | MAJOR | |
| 31 | 0.36 | 0.43 | 0.42 | NO | |
| 32 | 0.22 | 0.95 | 0.96 | NO | |
| 33 | 0.15 | 0.89 | 0.92 | MINOR | |
| 34 | 0.16 | 0.88 | 0.89 | MINOR | |
| 35 | 1.0 | 1.0 | 1.0 | — | CONVENTIONAL EXAMPLE 2 |

TABLE 9

| No. | SEALING STRUCTURE | VACUUM PRESSURE (Torr) |
|---|---|---|
| 1 | FIGS. 6(a) ~ 6(C) FIGS. 10(A) ~ 10(C) | >6 × 10⁻¹¹ 4 × 10⁻¹⁰ |
| 2 | FIGS. 7(A) ~ 7(C) FIGS. 10(A) ~ 10(C) | >6 × 10⁻¹¹ 3 × 10⁻¹⁰ |
| 3 | FIGS. 8(A) ~ 8(C) FIGS. 10(A) ~ 10(C) | >6 × 10⁻¹¹ 5 × 10⁻¹⁰ |
| 4 | FIGS. 9(A) ~ 9(C) FIGS. 10(A) ~ 10(C) | >6 × 10⁻¹¹ 2 × 10⁻¹⁰ |

TABLE 10

| No. | SEALING STRUCTURE | VACUUM PRESSURE (Torr) |
|---|---|---|
| 21 | FIGS. 6(a) ~ 6(C) FIGS. 10(A) ~ 10(C) | >6 × 10⁻¹¹ 2 × 10⁻¹⁰ |
| 22 | FIGS. 7(A) ~ 7(C) FIGS. 10(A) ~ 10(C) | >6 × 10⁻¹¹ 3 × 10⁻¹⁰ |
| 23 | FIGS. 8(A) ~ 8(C) FIGS. 10(A) ~ 10(C) | >6 × 10⁻¹¹ 2 × 10⁻¹⁰ |
| 24 | FIGS. 9(A) ~ 9(C) FIGS. 10(A) ~ 10(C) | >6 × 10⁻¹¹ 5 × 10⁻¹⁰ |

What is claimed is:

1. A super high vacuum vessel having a member suitable for a super high vacuum pressure exceeding $10^{-10}$ Torr, said vacuum vessel having a member, said member comprising:
   a) at least one Platinum-series metal having 0.02 wt. % to 1.00 wt. % selected from a group consisting of Pd, Pt, Rh, Ru, Re, and Os;
   b) at least one transition metal having 0.1 wt. % to 3.0 wt. % selected from a group consisting of Co, Fe, Cr, Ni, Mn, and Cu;
   c) at least one rare earth series metal having 0.1 wt. % to 3.0 wt. % selected from a group consisting of La, Ce, Pr, Nd, Sm, Gd, Tb, Dy, Ho, Er, and Y;
   d) Aluminum ranging from 0.2 wt. % to 9.5 wt. %;
   e) impurity elements of C, N, and O, C being equal or less than 0.05 wt. %, N being equal or less than 0.05 wt. %, O being equal or less than 0.08 wt. %; and
   f) balance Ti and inevitable impurities.

2. A super high vacuum vessel having a member suitable for a super high vacuum pressure as see forth in claim 1, wherein said Al ranges from 0.2 wt. % to 1.5 wt. %.

3. A super high vacuum vessel having a member suitable for a super high vacuum pressure as see forth in claim 1, wherein said member comprises a flange shaped shaft coupling, a knife edge surface of the flange shaped shaft coupling being treated with Au for preventing oxidation therefrom.

4. A super high vacuum vessel having a member suitable for a super high vacuum pressure as set forth in claim 1, wherein said member comprises a flange shaped shaft coupling, a knife edge surface of the flange shaped shaft coupling being treated with TiN for preventing oxidation therefrom and for preventing wear-out therefrom.

5. A super high vacuum vessel having a member suitable for a super high vacuum pressure as set forth in claim 1, wherein said member comprises a flange shaped shaft coupling which is provided with a sealing packing member, said sealing packing member being made of a high purity Ti comprising less than or equal to 0.08 wt. % O, less than or equal or 0.001 wt. % H, less than or equal to 0.042 wt. % Fe, less than or equal to 0.006 wt. % C, and less than or equal to 0.005 wt. % N.

6. A super high vacuum vessel having a member suitable for a super high vacuum pressure as set forth in claim 1, comprising an oxide or a nitride protective surface film on at least part of the outside surface of the vacuum vessel.

7. A super high vacuum vessel having a member suitable for a super high vacuum pressure as set forth in claim 1, wherein said member comprises a vessel body and flange shaped shaft coupling, said vessel body and flange shaped shaft coupling being integrated by electron beam welding.

8. A super high vacuum vessel having a member suitable for a super high vacuum pressure exceeding $10^{-10}$ Torr, said member comprising:

a) at least one Platinum series metal ranging from 0.02 wt. % to 1.00 wt.% selected from a group consisting of Pd, Pt, Rh, Re, and Os;

b) at least one transition series metal ranging from 0.1 wt. % to 3.0 wt selected from a group consisting of La, Ce, Pr, Nd, Sm, Gd, Tb, Dy, Ho, Er, and Y;

c) impurity elements of C, N, and O, said C being less than or equal to 0.05 wt. %, said N being less than or equal to 0.05 wt. %, said O being less than or equal to 0.08 wt. %; and d) balance Titanium and inevitable impurities.

9. A super high vacuum vessel having a member suitable for a super high vacuum pressure as set forth in claim 8, wherein said member comprises at least one flange shaped shaft coupling, a knife edge surface of the flange shaped shaft coupling being treated with Au for preventing oxidation therefrom.

10. A super high vacuum vessel having a member suitable for a super high vacuum pressure as set forth in claim 8, wherein said member comprises a flange shaped shaft member, a knife edge surface of the flange shaped shaft member being treated with TiN for preventing oxidation therefrom and For preventing wear-out therefrom.

11. A super high vacuum vessel having a member suitable for a super high vacuum pressure as set forth in claim 8, wherein said member comprises a flange shaped shaft coupling which is provided with a sealing packing member, said sealing packing member being made of a high purity Ti comprising less than or equal to 0.08 wt. % O, less than or equal or 0.001 wt. % H, less than or equal to 0.042 wt. % Fe, less than or equal to 0.006 wt. % C, and less than or equal to 0.005 wt. % N.

12. A super high vacuum vessel having a member suitable for a super high vacuum pressure as set forth in claim 8, comprising an oxide or a nitride protective surface film on at least part of the outside surface of the vacuum vessel.

13. A super high vacuum vessel having a member suitable for a super high vacuum pressure as set forth in claim 8, wherein said member comprises a vessel body and flange shaped shaft coupling, said vessel body and flange shaped shaft coupling being integrated by electron beam welding.

14. A super high vacuum vessel having a member suitable for a super high vacuum pressure as set forth in claim 13, wherein a non-oxygen copper is used as the gasket member for sealing, and said gasket member is attached on at least one of said double knife edge portions.

15. A super high vacuum vessel having a member suitable for a super high vacuum pressure as set forth in claim 14, wherein a noble metal is used to treat a surface of the sealing gasket member for prevention of oxidation.

16. A super high vacuum vessel sealing structure having a member suitable for a super high vacuum pressure as set forth in claim 15, wherein said vacuum vessel sealing structure comprises:

a) at least one Platinum-series metal ranging from 0.02 wt. % to 1.00 wt. % selected from a group consisting of Pd, Pt, Rh, Ru, Re, and Os;

b) at least one transition metal ranging from 0.1 wt. % to 3.0 wt. % selected from a group of Co, Fe, Cr, Ni, Mn, and Cu;

c) at least one rare earth series element ranging from 0.02 wt. % to 0.50 wt. % selected from a group of La, Ce, Pt, Nd, Sm, Gd, Tb, Dy, Ho, Er, and Y;

d) Al ranging from 0.2 wt. % to 9.5 wt. %;

e) impurity elements of C, N, and O, said C being equal to or less than 0.05 wt. %, said N being equal to or less than 0.05 wt. %, said O being equal to or less than 0.08 wt. %; and f) balance Ti and inevitable impurities.

17. A super high vacuum vessel having a member suitable for a super high vacuum pressure as set forth in claim 16, wherein said Al ranges from 0.2 wt. % to 1.5 wt. %.

* * * * *